C. N. DUNHAM.
Eyeglass.

No. 233,738. Patented Oct. 26, 1880.

Witnesses:
A. P. Grant,
W. F. Kircher

Inventor:
Charles N. Dunham,
by John A. Diedersheim
ATTORNEY.

UNITED STATES PATENT OFFICE.

CHARLES N. DUNHAM, OF PHILADELPHIA, PENNSYLVANIA.

EYEGLASSES.

SPECIFICATION forming part of Letters Patent No. 233,738, dated October 26, 1880.

Application filed December 27, 1879.

*To all whom it may concern:*

Be it known that I, CHARLES N. DUNHAM, of the city and county of Philadelphia, and State of Pennsylvania, have invented a new and useful Improvement in Eyeglasses, which improvement is fully set forth in the following specification and accompanying drawings, in which—

Figure 1:
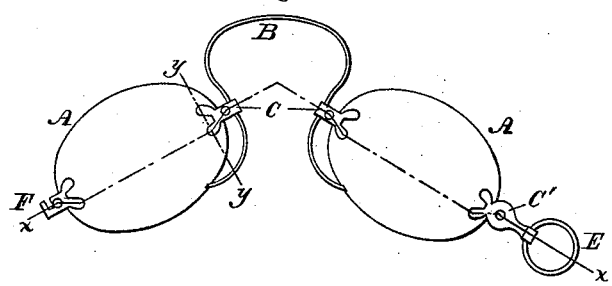
Figure 2:
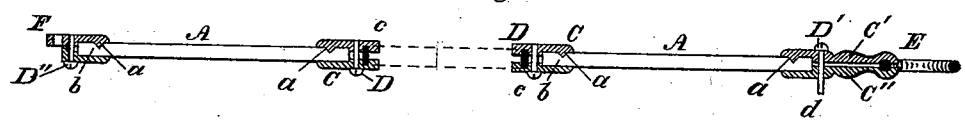
Figure 3:
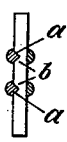

Figure 1 is a face view of a pair of eyeglasses embodying my invention. Fig. 2 is a transverse section in line $x\,x$, Fig. 1. Fig. 3 is a section, enlarged, in line $y\,y$, Fig. 1, the parts being separated.

Similar letters of reference indicate corresponding parts in the several figures.

My invention consists in connecting the glasses and spring-bow by means of clips formed in sections, the inner side or sides of each of which being provided with spurs or teats, which enter depressions or grooves in the glasses, said clips being drawn together by means of screws or rivets, and thus securely attached to the glasses, whereby the glasses and bow are prevented from displacement or slipping.

It also consists in attaching to the glasses the catch by which the glasses are held folded, by means of clips which possess features similar to a clip of the glasses and bow, whereby the handle and catch are securely attached in position without liability of displacement or slipping.

Referring to the drawings, A represents the glasses, and B the spring-bow of a pair of eyeglasses.

C represents metal clips, each formed of two pieces or sections, on the inner side of one or both of which are two or more spurs or teats, $a$, which are adapted to enter depressions or grooves $b$ on the face of the glass.

A groove, $c$, is formed on the inner side of each section of a clip, C, for the reception of the edges of the spring-bow, and the sections of each clip are tapped for engagement of a screw, D. The bow is fitted in the grooves $c$ of the clips, the sections of the clips are applied to the glasses A so as to clasp them, the spurs or teats $a$ enter the depressions or grooves $b$, and the screws D are properly fitted and turned, whereby the sections are firmly clamped, with the glasses and bow between them, so that displacement of the glasses and bow and slipping of the contiguous parts are prevented, and the glasses and bow are reliably connected.

By loosening the screws D the bow may be shifted and adjusted, as desired, after which the screws are tightened, and the bow remains in its adjusted position.

The handle E is connected to one of the glasses by a clip, C′, which is similar to the clips C. The handle is fitted between the sections of the clip properly located on the glass, with the spurs or teats in the depressions or grooves in the glass, the screw D′ is tightened, and thus the handle is firmly attached to the glass.

F represents the catch for holding the glasses folded, said catch engaging with a pin, $d$, on the handle or handle-clips of the glass, and formed with one section of the clip C″.

When the two sections of the clip are applied to the glass and the screw D″ properly fitted to the sections, the catch is firmly and reliably attached to the glass.

The clips form simple and inexpensive fastenings for the respective parts, and avoid frames for the glasses and piercing of the glasses for the passage of screws or rivets.

It is evident that, in lieu of screws, I may employ rivets for connecting the sections of clips, and each clip may be formed of a bifurcated or forked piece, the operation being similar to that hereinbefore set forth.

The clips are also applicable to spectacles for connecting the glasses with the bridge and sides, respectively.

Having thus described my invention, what I claim as new, and desire to secure by Letters Patent, is—

1. In combination with an eyeglass, a metallic clip and a screw for clamping the same, said glass being arranged to abut against a square internal shoulder of said clip in front of said screw.

2. In combination with glasses A and bow B, the clips C, each consisting of two sections grooved at $c$, and clamped together so that the same screw serves to fasten both the bow and the glass.

3. In combination with an eyeglass, a metallic clip formed in two sections and having a shoulder against which said glass abuts, and a screw behind said shoulder, which clamps said clip on said glass, substantially as set forth.

CHAS. N. DUNHAM.

Witnesses:
JOHN A. WIEDERSHEIM,
W. F. KIRCHER.